US010369725B2

(12) United States Patent
Choi et al.

(10) Patent No.: US 10,369,725 B2
(45) Date of Patent: Aug. 6, 2019

(54) METHOD FOR PREPARING FREE-STANDING POLYMER FILM WITH MICROPORES

(71) Applicant: The Industry & Academic Cooperation in Chungnam National University (IAC), Daejeon (KR)

(72) Inventors: Ho-Suk Choi, Daejeon (KR); Van Tien Bui, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 129 days.

(21) Appl. No.: 14/959,344

(22) Filed: Dec. 4, 2015

(65) Prior Publication Data
US 2016/0339609 A1 Nov. 24, 2016

(30) Foreign Application Priority Data
May 21, 2015 (KR) ........................ 10-2015-0071166

(51) Int. Cl.
*B01D 67/00* (2006.01)
*B29C 39/02* (2006.01)
(Continued)

(52) U.S. Cl.
CPC ........ *B29C 39/026* (2013.01); *B01D 67/0013* (2013.01); *B01D 67/0034* (2013.01);
(Continued)

(58) Field of Classification Search
CPC .............. B29C 39/026; B01D 67/0034; B01D 67/0013
See application file for complete search history.

(56) References Cited

U.S. PATENT DOCUMENTS

| 8,357,616 B2* | 1/2013 | Linder | ................ B81C 1/00246 216/41 |
| 2013/0014818 A1* | 1/2013 | Cotlet | ................ H01L 51/4253 136/256 |
| 2015/0056399 A1* | 2/2015 | Takeoka | .................. B29C 41/12 428/64.1 |

FOREIGN PATENT DOCUMENTS

| GB | 1175046 A | * 12/1969 | ................ C08J 7/02 |
| GB | 1268828 A | *  3/1972 | ................ C08J 7/02 |

OTHER PUBLICATIONS

Bui, Van-Tien, Seung Hyeon Ko, and Ho-Suk Choi. "A surfactant-free bio-compatible film with a highly ordered honeycomb pattern fabricated via an improved phase separation method." Chemical Communications 50.29 (2014): 3817-3819.*

(Continued)

*Primary Examiner* — Robert C Dye
*Assistant Examiner* — Nicholas R Krasnow
(74) *Attorney, Agent, or Firm* — Mintz Levin Cohn Ferris Glovsky and Popeo, P.C.; Kongsik Kim (57) ABSTRACT

The present invention relates to a method for preparing a free-standing polymer film with micropores in a simple and economical way, and particularly to a method for preparing a free-standing polymer film with micropores that includes: (a) forming a thin film of a water-soluble polymer on a substrate; (b) forming a thin film of a hydrophobic polymer on the water-soluble polymer thin film; (c) treating the substrate having the polymer thin films formed on with a mixed solution of a solvent and a C1-C3 alcohol and drying the substrate; and (d) immersing the dried substrate in water to dissolve the water-soluble polymer thin film and thereby to peel the hydrophobic polymer thin film from the substrate.

9 Claims, 7 Drawing Sheets

(51) Int. Cl.

| | | |
|---|---|---|
| *B29C 39/36* | (2006.01) | |
| *B29D 7/01* | (2006.01) | |
| *B29C 41/12* | (2006.01) | |
| *B29C 41/22* | (2006.01) | |
| *C08J 5/18* | (2006.01) | |
| *B01D 69/02* | (2006.01) | |
| *B29K 33/00* | (2006.01) | |
| *B29K 105/04* | (2006.01) | |
| *B29K 105/00* | (2006.01) | |

(52) U.S. Cl.
CPC .............. *B01D 69/02* (2013.01); *B29C 39/36* (2013.01); *B29C 41/12* (2013.01); *B29C 41/22* (2013.01); *B29D 7/01* (2013.01); *C08J 5/18* (2013.01); *B01D 2323/08* (2013.01); *B01D 2325/04* (2013.01); *B29K 2033/12* (2013.01); *B29K 2105/04* (2013.01); *B29K 2105/256* (2013.01); *B29K 2995/0093* (2013.01); *C08J 2325/06* (2013.01); *C08J 2333/12* (2013.01)

(56) References Cited

OTHER PUBLICATIONS

"Bui-2015"; Bui, V.T., Ko, S.H. and Choi, H.S., 2015. Large-scale fabrication of commercially available, nonpolar linear polymer film with a highly ordered honeycomb pattern. ACS applied materials & interfaces, 7(19), pp. 10541-10547. <https://dx.doi.org/10.1021/acsami.5b02097> (Year: 2015).*

Bui-2014S—Electronic Supplementary Material (ESI)—Bui, V.T., Kob, S.H. and Choi, H.S., Highly ordered honeycomb pattern of surfactant-free bio-compatible film via improved phase separation method.<https://pdfs.semanticscholar.org/7dbd/2d33458f752d5e5556ff1cfb088063c4c7a6.pdf> (Year: 2014).*

Bui, V.T. et al., "Large-Scale Fabrication of Commercially Available, Nonpolar Linear Polymer Film with a Highley Ordered Honeycomb Pattern", ACS Applied Materials & Interfaces, (2015) pp. A-G.

* cited by examiner

METHOD FOR PREPARING FREE-STANDING POLYMER FILM WITH MICROPORES

CROSS-REFERENCE TO RELATED APPLICATION

This application claims priority to Korean Application No. Korean Patent Application No.: 10-2015-0071166 filed May 21, 2015, which is incorporated herein by reference.

TECHNICAL FIELD

The present invention relates to a method for preparing a free-standing polymer film having micropores in a simple and economical way.

BACKGROUND ART

Having a large surface area, the micropore structures with a high level of regularity have come into the spotlight in various fields, such as microfluidics, micro-electromechanical systems, biotechnology, organic photo-electronics, etc. For decades, there have been developed different top-down and bottom-up approaches, including etching, colloidal templating, phase separation of block copolymers, emulsification, breath figure (BF), etc., to the synthesis of polymer films with pores of a uniform size from nano to micro scales.

In the typical BF method, a polymer solution is first cast on a substrate under high humidity. During the evaporation of the solvent, the surface temperature of the solution was decreased, which caused the condensation of water as small droplets on the substrate. The ordered water droplets then acts as an ordered template by self-assembly on the surface of the polymer solution. Thanks to its versatility and economic feasibility, the BF method has become the most popular approach to a synthesis of films having a honeycomb-patterned micropore structure. However, the BF method requires the use of equipment for a precise control of the humidity in high level during the synthesis of polymer films and is thus difficult to use in the production of large-area films. In addition, the BF method, particularly in the synthesis of hydrophobic polymer films, further requires the use of nano-particles or surfactants in order to stabilize the condensed water droplets on a polymer solution.

In contrast to the BF method, the non-solvent induced phase separation (NIPS) method enables the production of polymers with micropores on a large scale using a solution under atmospheric conditions. The NIPS method is the method that involves dissolving a polymer in a solvent to form a homogeneous solution, forming the polymer solution into a defined shape and then immersing the formed material in a non-solvent to prepare a separation film. The polymer films, when produced by the NIPS method, have an asymmetric structure with macrovoids and thus display a relatively low tensile strength. For this reason, a variety of organic/inorganic additives to enhance hydrophilicity or strengths are commonly added to the polymer solution in the synthesis of polymer films using the NIPS method.

Seeking for a solution to the above-mentioned problems with the prior art, the inventors of the present invention have developed a composite method using a combination of the NIPS and BF methods as disclosed in Korean Patent Publication No. 10-2013-0055413. This method adopts a simple procedure of applying a mixed solution of a solvent and a non-solvent to a polymer film formed on a substrate and then drying the polymer film, thereby making it possible to form a polymer pattern having micropores on different substrates, to prepare a polymer film in the atmospheric environment and to pattern hydrophobic polymers as well as hydrophilic polymers without using a surfactant or an additive.

It is necessary to have the free-standing polymer film peeled from the substrate in order to make the use of the polymer film synthesized on the substrate in the potential applications like tissue engineering materials, separation films, and so forth. The free-standing film is defined as a film a part of which is not in contact with a support material such as a substrate or a wall as in a micropore structure. The polymer film formed on a substrate has such an extremely low thickness from a few micrometers (μm) to a few scores of micrometers (μm). It is therefore required to employ a method of peeling the polymer film from the substrate with more ease, particularly for the fabrication of large-area polymer films. In addition, the polymer films having a through-pore structure in which pores are formed all through the film are of primary interest among the polymer films with micropores. But, there is no known approach to a simple fabrication process for producing hydrophobic polymer films with through-pore structures on a large scale. According to the cited document, Korean Patent Publication No. 10-2013-0055413, it is only in the case of the polymer films in which the polymers are hydrophilic polymers like poly(lactic acid) (PLA) that the micropore pattern can be selectively formed to contain either through (open) pores or blind (dead-end) pores which are interconnected only from one side and terminate inside the film material. In addition, only the blind-pore structure can be formed in the polymer films in which the polymers are hydrophobic polymers, such as polystyrene (PS), polymethyl methacrylate (PMMA), etc.

SUMMARY

For solving the problems with the prior art, it is an object of the present invention to provide a method of preparing a large-area free-standing polymer film with micropores as isolated from the substrate on a large scale by a simple fabrication process in the atmospheric environment without a precise control of the humidity.

It is another object of the present invention to provide a method of preparing a free-standing polymer film with micropores that has a through-pore structure by using hydrophilic polymers or even hydrophobic polymers.

The present invention, which is contrived to solve the problems with the prior art, is to provide a method for preparing a free-standing polymer film with micropores that includes: (a) forming a thin film of a water-soluble polymer on a substrate; (b) forming a thin film of a hydrophobic polymer on the water-soluble polymer thin film; (c) treating the substrate having the polymer thin films formed on with a mixed solution of a solvent and a C1-C3 alcohol and drying the substrate; and (d) immersing the dried substrate in water to dissolve the water-soluble polymer thin film and thereby to peel the hydrophobic polymer thin film from the substrate.

The present invention is directed to a method of preparing a free-standing film of a hydrophobic polymer while the free-standing film is isolated from a substrate, as an application of the method for preparing a micropore pattern on a substrate according to Korean Patent Publication No. 10-2013-0055413 filed by the inventors of the present invention. Extremely thin, the polymer thin film with a micropore pattern formed on a substrate is susceptible to damage under the physical forces applied to peel a free-standing polymer film from the substrate. The damage can be more serious particularly in the fabrication of large-area films. In the present invention, it is characterized by that the water-soluble polymer thin film formed between the substrate and the polymer pattern is dissolved in water to facilitate the peeling of the polymer film from the substrate.

In the present invention, the substrate functions as a temporary support and may include any one that is available as a support. Examples of the material for the substrate may include metals, such as copper, aluminum, etc., silicone, glass, poorly water-soluble resins, or the like. Further, the shape of the substrate is not specifically limited to the flat form.

As implied by itself, the term "water-soluble polymer" as used in the present invention means a polymer that can be dissolved in water. The function of the water-soluble polymer is to facilitate the peeling of the free-standing polymer film from the substrate by way of dissolution in water in the step (d). It is thus reasonable that any water-soluble polymer is available in the present invention and may not specifically limited in terms of the type. For the sake of making it easier to peel the film from the substrate, it is not desirable to use a water-soluble polymer having an extremely low solubility to water. Thus, the water-soluble polymer acceptably has a solubility to water at least 5 wt. %, more preferably at least 10 wt. %. Examples of the water-soluble polymer may include, but are not specifically limited to, any one selected from the group consisting of polysulfonic acid (PSS), polylactic acid (PLA), polyacrylic acid (PAA), polycarbonic acid (PCA), and polyvinyl alcohol (PVA).

Subsequently, a hydrophobic polymer thin film is formed on the water-soluble polymer thin film. The synthesis of the polymer thin film may use any known method in the prior art, examples of which known method may include, but are not specifically limited to, doctor blade coating, bar coating, dip coating, or spin coating. As the thin film is prepared by dissolving the hydrophobic polymer in a hydrophobic solvent, a hydrophobic polymer thin film can be easily formed on the water-soluble polymer thin film without making damage on the water-soluble polymer thin film. Examples of the hydrophobic polymer as used herein may include, but are not specifically limited to, any one selected from the group consisting of polystyrene (PS), polypropylene (PP), polyethylene (PE), polymethyl methacrylate (PMMA), polyethylene terephthalate (PET), polyvinyl chloride (PVC), polycarbonate (PC), and polyvinylidene fluoride (PVDF). Although the use of PMMA or PS is exemplified in the following examples of the present invention, other polymers can also be used to successfully prepare a free-standing polymer film.

The term "solvent" as used in the present invention refers to a substance capable of dissolving hydrophobic polymers, which substance is defined as "solvent" when the Hidebrand solubility parameter difference is less than 5 $J^{1/2}/c^{m3/2}$ or when the relative energy difference using the Hansen three-dimensional solubility parameter is within the interaction radius; or defined as "non-solvent" otherwise. The polymer used in the preparation of free-standing polymer films according to the present invention is a hydrophobic polymer. Accordingly, examples of the solvent as used herein may include any one selected from the group consisting of methylene chloride, chloroform, chloroethane, pentane, hexane, heptane, methyl acetate, ethyl acetate, tetrahydrofuran, ethyl ether, and toluene, which solvents are very volatile and immiscible with water and may be used alone or in combination. The solvents used in the following examples of the present invention are all chloroform. It is, however, verified that other solvents than chloroform can also be effectively used even through the pores of the polymer films come in different sizes due to the difference of the solvents in volatility.

In the present invention, the C1-C3 alcohol functions as a non-solvent to the hydrophobic polymers and forms liquid drops including condensed water in the air during the evaporation process to give a micropore structure. The content of the C1-C3 alcohol is preferably in the range of 5 to 20 vol. % in the mixture irrespective of the types of the solvent or the alcohol. When the alcohol content is less than 5 vol. % or greater than 20 vol. %, the micropores thus formed are susceptible to a serious deterioration in the size and arrangement regularities.

The present invention enables the production of hydrophobic free-standing polymer films that are impossible to realize in the prior art and particularly realizes the production of free-standing polymer films with through-pore structures. As can be seen from the following examples of the present invention, it is impossible to form through-pore structures without the water-soluble polymer thin film, even though the hydrophobic polymer thin film is formed to an extremely low thickness. This is presumably because the hydrophobic polymers dissolved in the solvent form a thin film with liquid drops having a high methanol content. Contrarily, when a hydrophobic polymer thin film is formed on a water-soluble polymer thin film, the interaction between the water-soluble polymer thin film and the liquid drops having a high methanol content helps forming the through-pore structure in the step (c) of using a mixed solution of the solvent and the C1-C3 alcohol. In the present invention, it is also possible to selectively form a free-standing polymer film having either a through-pore structure or a blind-pore structure by controlling the thickness of the hydrophobic polymer thin film. In this regard, the critical thickness of the thin film is variable depending on the conditions of the step (c) that involves the formation of pores. Thus, defining the critical thickness of the thin film in terms of a precise value is of no significance. Under specific conditions, the through-pore structure is formed when the thickness of the thin film is less than the critical thickness; and the blind-pore structure is formed when the thickness of the thin film is greater than the critical thickness. In addition, the higher thickness of the thin film results in the formation of the smaller micropores. It is therefore possible to control the surface pore structure of the free-standing film by controlling the thickness of the hydrophobic polymer thin film. The hydrophobic polymer thin film is partly dissolved in the mixed solution applied in the step (c) and becomes thinner than before the addition of the mixed solution, so the micropore structure is difficult to form when the hydrophobic polymer thin film is extremely thin. In conclusion, the thickness of the thin film is preferably at least 1 μm.

Unlike the BF method of the prior art, the method of the present invention enables the formation of micropore patterns without a strict control of the conditions, provided that the humidity is in the normal range of 20 to 90% and that the temperature is 0 to 5° C. The evaporation rate is too low under the conditions of extremely low temperature or extremely high humidity. The evaporation occurs too fast at extremely high temperature. Under extremely low humidity conditions, the condensation of water in the air is not so effective as to form the micropore pattern with efficiency. As the pores become larger in size at higher humidity and lower temperature, it is possible in the present invention to control the surface pore structure of the free-standing polymer film by controlling the temperature and humidity conditions in the drying process of the step (c).

As described above, the present invention enables the production of large-area free-standing polymer films with ease by using a simple preparation method without specific equipment. According to the prior art, the free-standing polymer films with regular pore structures are difficult to form using hydrophobic polymers. Particularly, the preparation of free-standing polymer films with a through-pore structure is considerably limited in the prior art. In contrast, the method of the present invention facilitates the production of regular pore structures even using hydrophobic polymers and makes it to control the size of the pores and prepare a free-standing polymer film selectively having either a through-pore structure or a blind-pore structure by using a simple procedure.

In addition, the present invention facilitates the peeling of the free-standing polymer film from the substrate without using external mechanical forces, thereby preventing potential damages on the film in the peeling process.

DETAILED DESCRIPTION

Hereinafter, the present invention will be described in further detail with reference to examples. The drawings and examples are given for the understanding of the disclosure of the present invention and not intended to limit or change the scope of the claims in the present invention. It is apparent to those skilled in the art that various modifications and changes are available within the scope of the claims in the present invention on the basis of the examples.

EXAMPLES

Example 1: Preparation of Free-Standing Polymer Film with Micropores Having Through-Pore or Blind-Pore Structure A 0.5 mm-thickness copper substrate (4Science, Korea) was washed sequentially with 0.1 M sulfuric acid and purified water and dried out with a nitrogen gas. PSS (Poly(4-styrene sulfonic acid, Mw ~75,000, 18 wt. % aqueous solution, Sigma Aldrich) was dried at 70° C. in a vacuum oven and dissolved in MeOH to form a wt. % solution. The PSS methanol solution thus obtained was used to perform a spin coating process on the copper substrate and then dried at 70° C. in a vacuum oven to form a PSS thin film as thick as 10 μm. A chloroform solution containing 10 wt. % of PMMA (PMMA EG920, LG Chem. Co.) was used to perform a spin coating process and then dried in the air to form a PMMA thin film as thick as 16 μm.

The copper substrate on which the PMMA/PSS thin films were formed was immersed in a mixed solution of chloroform and methanol for 5 seconds using a dip coater (E-flex, Korea) and taken out to dry at the room temperature (relative humidity: 60%) for 12 hours. The copper substrate completely dried out was immersed in water to dissolve the PSS film so that the PMMA film was peeled from the substrate, thereby obtaining the PMMA film in the form of a free-standing film.

Figure 1:
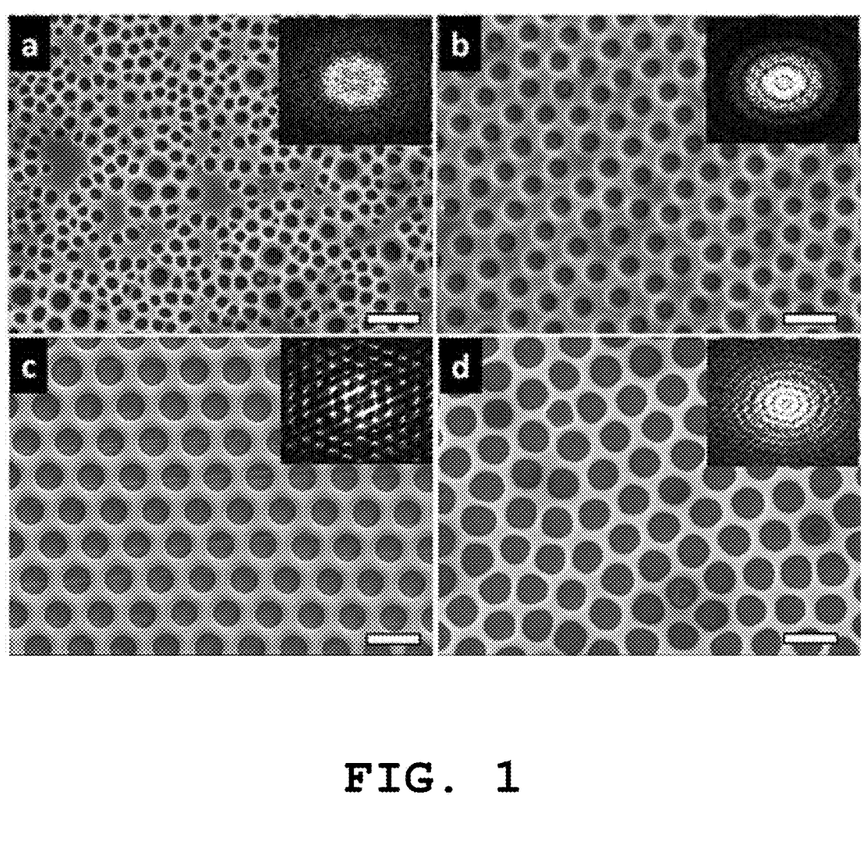
FIG. 1 presents FESEM images showing the surface pore structures of free-standing polymer films prepared in one example of the present invention as a function of the mixed ratio of solvent to non-solvent.

FIG. 1 presents FESEM (Field Emission Scanning Electron Microscopy) images showing the micropore structures of the polymer films prepared with a solution having a chloroform/methanol volume ratio of 100/0 (a), 90/10 (b), 85/15 (c), or 80/20 (d). The resultant data acquired from the images are presented in Table 1.

TABLE 1

| Chloroform/methanol (v/v) | Pore size (μm) | Pore density (pores $10^{-3}/\mu m^2$) | Entropy |
|---|---|---|---|
| 100/0 | 1.03 ± 0.23 | 344.0 | 1.265 |
| 90/10 | 1.89 ± 0.10 | 107.5 | 0.933 |
| 85/15 | 2.72 ± 0.06 | 80.2 | 0.079 |
| 80/20 | 3.01 ± 0.21 | 72.0 | 0.583 |

Referring to FIG. 1, in the case of the BF method using the solvent, chloroform, alone, the standard deviation of the pore size amounts to about 22% of the average value, which means that the pore size and the pore size distribution are considerably irregular. In contrast, according to the method of the present invention using a combination of a solvent and a non-solvent, the standard deviation of the pore size is greatly reduced to imply that the pore size is uniform with the even pore size distribution. Particularly, when using a solvent/non-solvent system having a chloroform/methanol volume ratio of 85/15, the pores are formed to have a considerably regular pore structure with the entropy of 0.079. The pore size increases with an increase in the content of the non-solvent.

Unless stated otherwise, the solvent/non-solvent system as used in the following examples has a chloroform/methanol volume ratio of 85/15 (v/v).

Figure 2:
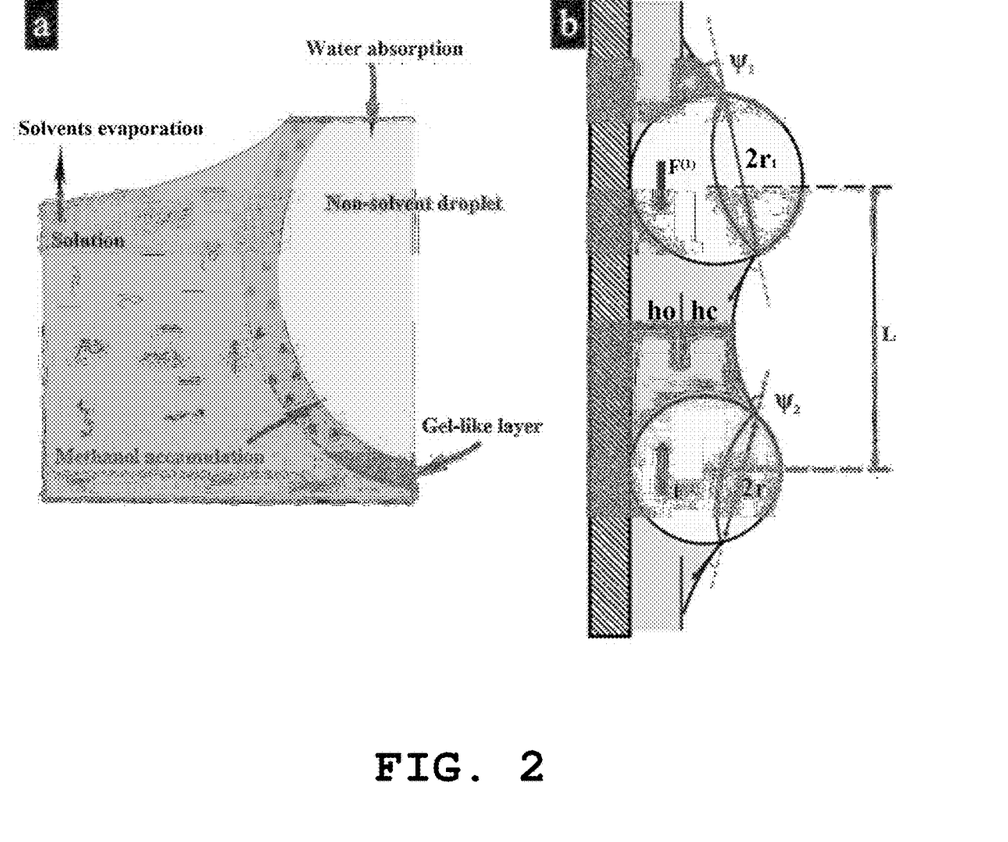
FIG. 2 is a mimetic diagram showing the production procedures of the surface pore structure.

FIG. 2 presents a mimetic diagram illustrating the procedure of forming a micropore pattern in a hydrophobic polymer by using a solvent/non-solvent system. Methanol that is the non-solvent to the hydrophobic polymer has a low volatility in relation to chloroform that is the solvent to the hydrophobic polymer. Thus, the methanol content of the solution increases with the progress of evaporation after the polymer film is immersed in the solvent/non-solvent mixture. In addition, the evaporation brings about the condensation of water in the air to cause a phase separation from the solution and thereby to form water-containing non-solvent liquid drops. As the liquid drops with a high content of methanol that is the non-solvent are formed by the evaporation of the solvent, the monomers of the polymer are transferred to the boundaries with the liquid drops and exist in the gel-like form at the boundaries due to the effect of the non-solvent, thereby stabilizing the shape of the liquid drops. On the contrary, the BF method cannot stabilize the liquid drops when using the hydrophobic polymers even through it is necessary to form a stable structure that keeps the condensed water drops merging together. Thus, according to the BF method, the liquid drops combine together to form an irregular surface structure.

Figure 3:
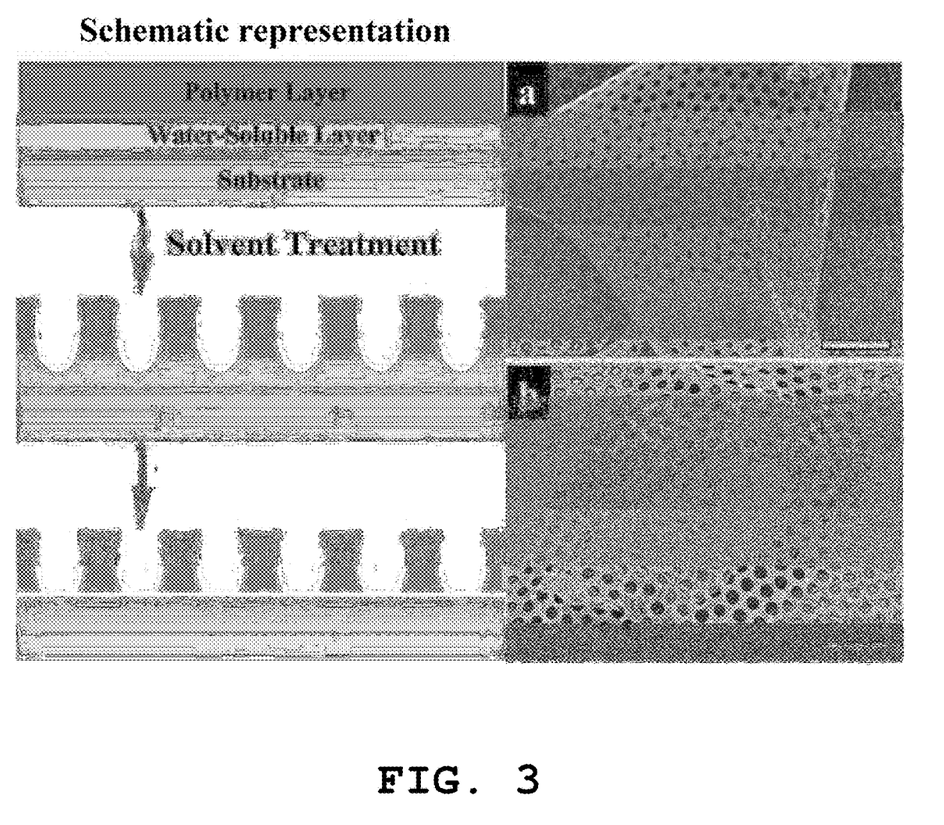
FIG. 3 presents a flow chart showing the procedures of preparing the free-standing polymer film of the present invention and FESEM images of the free-standing polymer film prepared.

FIG. 3 shows a mimetic diagram of the process of preparing a polymer film with a through-pore structure according to the present invention and an FESEM image of the polymer film thus prepared. In FIG. 3, the scale bar indicates 20 μm. A solvent and non-solvent system is applied to the PMMA polymer formed on the PSS thin film and then evaporated, so liquid droplets having a high methanol content are formed inside the PSS thin film as the solvent evaporates. Then, the solvent is completely evaporated and dried out to yield a polymer film with pores. Subsequently, the polymer film is immersed in water to dissolve the PSS film, completing a polymer film with a through-pore structure.

In this regard, it is also possible to form a polymer film with micropores having a blind-pore structure other than a through-pore structure by properly controlling the thickness of the PMMA polymer thin film. Under the conditions of this example, deposition of the PMMA polymer thin film as thick as 20 μm or less results in the formation of a through-pore structure; and deposition of the PMMA polymer thin film thicker than 20 μm ensures the formation of a blind-pore structure.

Comparative Example

Figure 4:
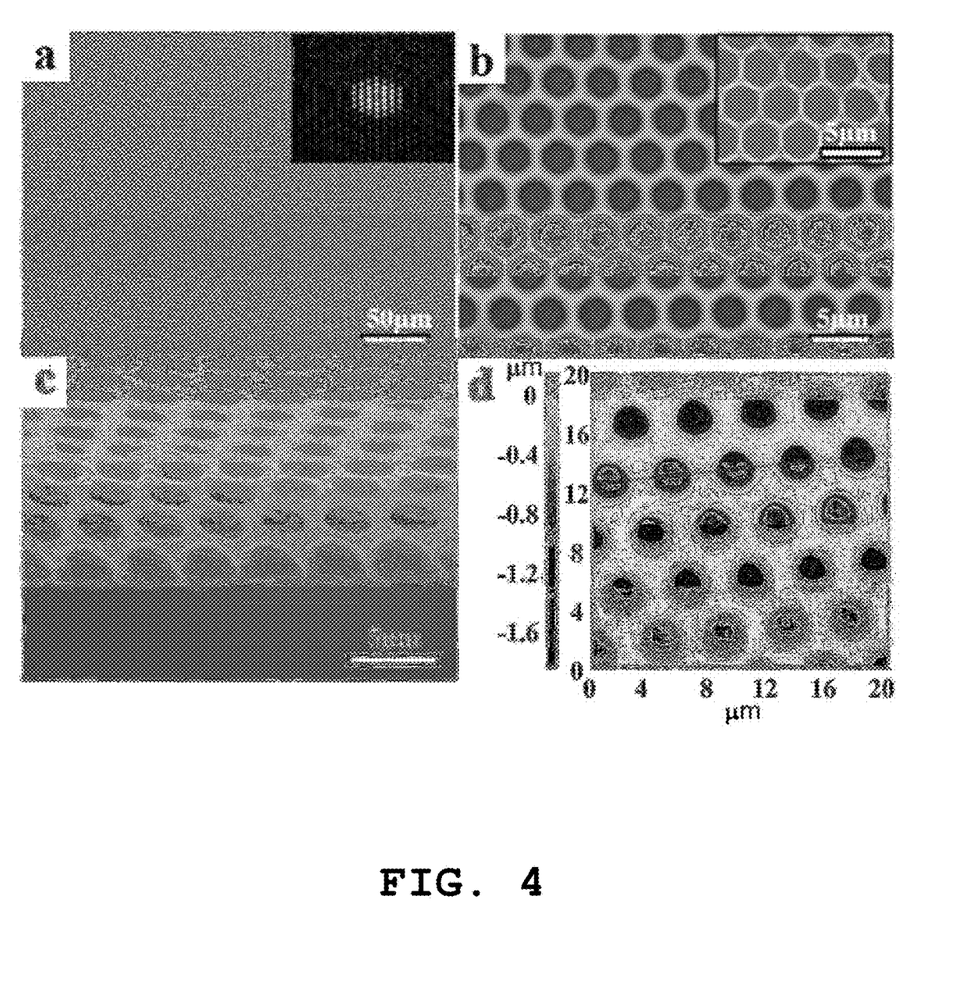
FIG. 4 presents FESEM images of free-standing polymer films having a blind-pore structure according to a preparation method in a comparative example of the present invention.

The procedures were performed in the same manner as described in Example 1 to prepare a polymer film with micropores on a substrate, excepting that a 16 μm-thickness PMMA thin film was formed directly on the substrate without forming a PSS thin film. The polymer film was mechanically peeled from the substrate. FIG. 4 presents FESEM images showing the structure of the polymer film prepared by this method. As can be seen from FIG. 4, the polymer film has a blind-pore structure other than a through-pore structure even through the PMMA polymer thin film is considerably thin.

Example 2: Effect of Humidity on Micropore Structure

Figure 5:
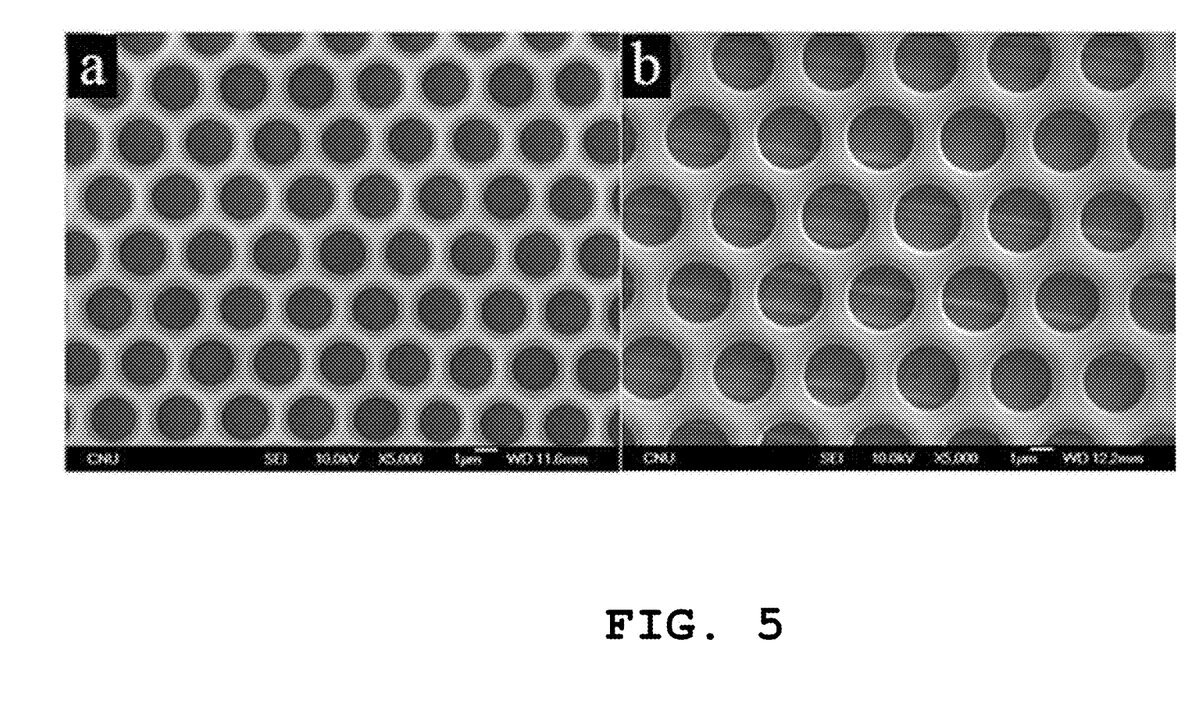
FIG. 5 presents FESEM images showing the surface pore structures of free-standing polymer films prepared in another example of the present invention as a function of the humidity conditions.

The procedures were performed in the same manner as described in Example 1 to prepare a PMMA polymer film, excepting that the relative humidity was maintained at 40% or 80% in the step of drying the solvent and non-solvent mixture. FIG. 5 presents the FESEM images of the polymer films prepared, where the polymer film of the image (a) is prepared at relative humidity of 40%; and the polymer film of the image (b) is prepared at relative humidity of 80%. As can be seen from FIG. 5, the size of the micropores increases with an increase in the relative humidity in the drying process.

This is presumably because the amount of water absorbed into the liquid droplets having a high methanol content becomes greater at the higher relative humidity, increasing the size of the liquid droplets.

Example 3: Effect of Temperature on Micropore Structure

Figure 6:
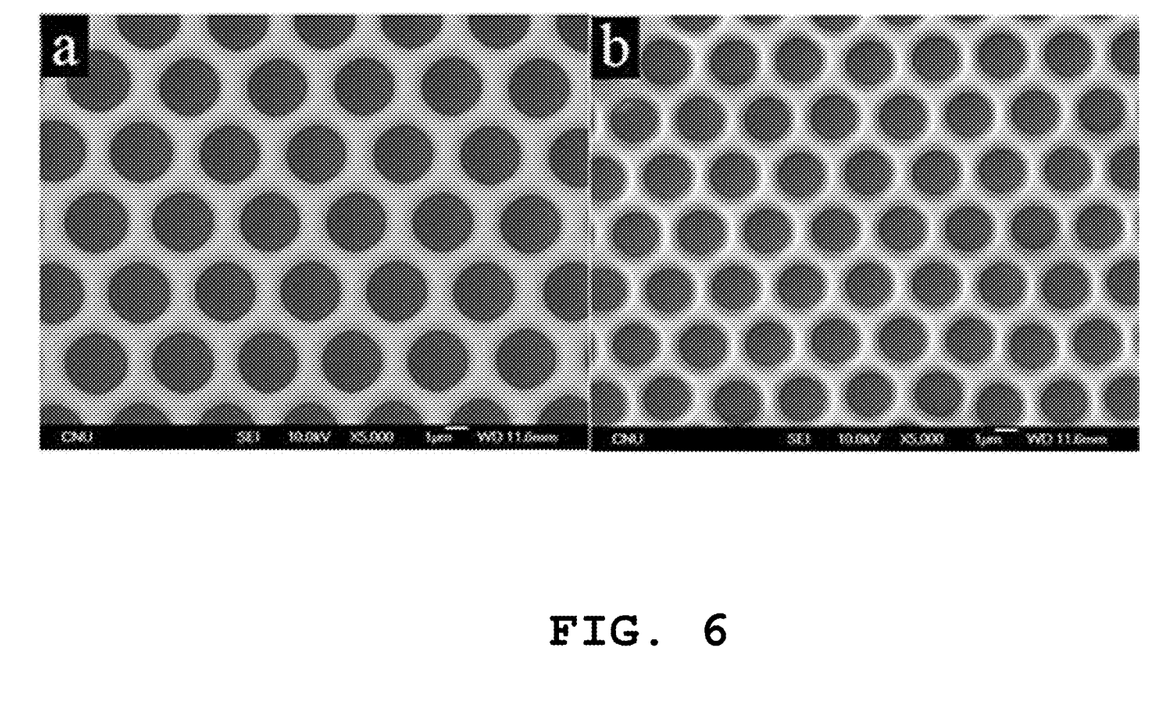
FIG. 6 presents FESEM images showing the surface pore structures of free-standing polymer films prepared in still another example of the present invention as a function of the temperature conditions.

The procedures were performed in the same manner as described in Example 1 to prepare a PMMA polymer film, excepting that the temperature was maintained at 10° C. or 30° C. in the step of drying the solvent and non-solvent mixture. FIG. 6 presents the FESEM images of the polymer films prepared, where the polymer film of the image (a) is prepared at 10° C.; and the polymer film of the image (b) is prepared at 30° C. As can be seen from FIG. 6, the size of the micropores increases with a decrease in the room temperature in the drying process.

This is presumably because the evaporation rate of the solvent decreases and the phase separation occurs more effectively at the lower temperature, making it easier to grow the liquid drops in size and thus increasing the size of the micropores.

Example 4: Effect of Concentration of Polymer Solution on Micropore Structure

Figure 7:
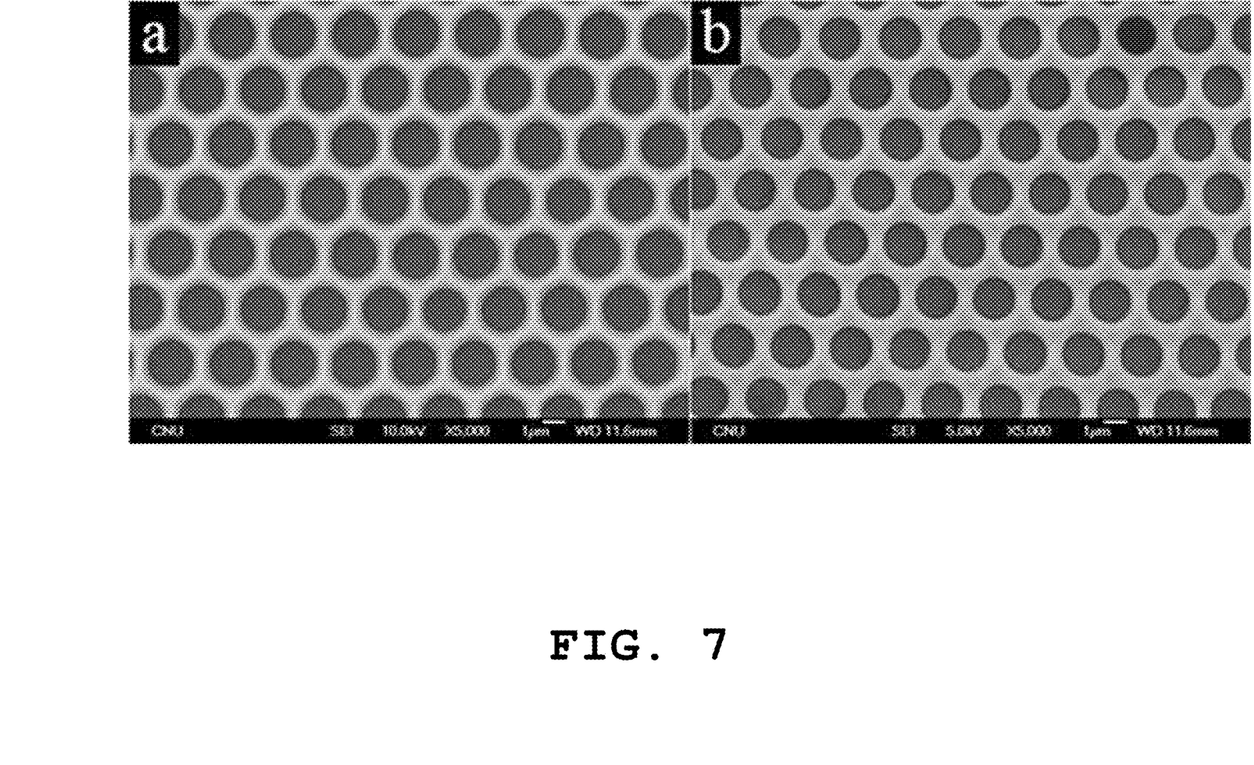
FIG. 7 presents FESEM images showing the surface pore structures of free-standing polymer films prepared in still further another example of the present invention as a function of the concentration of the polymer solution.

The procedures were performed in the same manner as described in Example 1 to prepare a PMMA polymer film, excepting that the concentration of the polymer solution was controlled to 5 wt. % or 15 wt. % in the preparation of the PMMA polymer thin film. FIG. 7 presents the FESEM images of the polymer films prepared, where the polymer film of the image (a) is prepared with the polymer solution having a concentration of 5 wt. %; and the polymer film of the image (b) is prepared with the polymer solution having a concentration of 15 wt. %. As can be seen from FIG. 7, the size of the micropores increases with a decrease in the concentration of the polymer solution.

This is presumably because using the polymer solution of the higher concentration results in production of the polymer thin film having the greater thickness and the higher viscosity in the phase separation caused by the application of the solvent/non-solvent mixture, thereby limiting the growth of the liquid drops.

Example 5: Preparation of PS Free-Standing Polymer Film

The procedures were performed in the same manner as described in Example 1 to prepare a polymer film with a through-pore structure, excepting that a PS thin film other than a PMMA thin film was formed to a thickness of 16 μm by performing a spin coating process with a 10 wt. % PS (GPPS 15NFI, LG Chem. Co.) chloroform solution and then drying in the air.

What is claimed is:
1. A method for preparing a free-standing polymer film with through pores, comprising:
   (a) forming a thin film of a water-soluble polymer on a substrate;
   (b) applying, on the water soluble polymer thin film, a hydrophobic polymer solution prepared by dissolving a hydrophobic polymer in a single pure solvent to form a non-porous thin film of a hydrophobic polymer on the water-soluble polymer thin film;
   (c) applying, on the hydrophobic polymer thin film, a mixed solvent that contains a solvent and a non-solvent,
   wherein the non-solvent is a C1-C3 alcohol and the content of the C1-C3 alcohol in the mixed solvent is 5 to 20 vol. %,
   and drying the resulting substrate at a relative humidity of 20 to 90%, thereby generating honeycomb-patterned through-pores in the non-porous thin film of the hydrophobic polymer; and

(d) immersing the dried substrate in water to dissolve the water-soluble polymer thin film, thereby enabling the hydrophobic polymer thin film having a honeycomb-patterned through-pore structure to be peeled from the substrate.

2. The method as claimed in claim 1, wherein the water-soluble polymer has a water solubility of at least 5 wt. %.

3. The method as claimed in claim 1, wherein the water-soluble polymer comprises polysulfonic acid (PSS), polylactic acid (PLA), polyacrylic acid (PAA), polycarbonic acid (PCA), polyvinyl alcohol (PVA), or any combination thereof.

4. The method as claimed in claim 1, wherein the hydrophobic polymer comprises polystyrene (PS), polypropylene (PP), polyethylene (PE), polymethyl methacrylate (PMMA), polyethylene terephthalate (PET), polyvinyl chloride (PVC), polycarbonate (PC), polyvinylidene fluoride (PVDF), or any combination thereof.

5. The method as claimed in claim 1, wherein the single pure solvent comprises methylene chloride, chloroform, chloroethane, pentane, hexane, heptane, methyl acetate, ethyl acetate, tetrahydrofuran, ethyl ether, toluene, or any combination thereof.

6. The method as claimed in claim 1, wherein the surface pore structure of the free-standing polymer film is controlled by controlling the thickness of the hydrophobic polymer thin film.

7. The method as claimed in claim 1, wherein the drying process of the step (c) is performed at a temperature of 0 to 50° C.

8. The method as claimed in claim 7, wherein the water-soluble polymer has a water solubility of at least 5 wt. %.

9. The method as claimed in claim 1, wherein the solvent of the mixed solvent of the step (c) comprises methylene chloride, chloroform, chloroethane, pentane, hexane, heptane, methyl acetate, ethyl acetate, tetrahydrofuran, ethyl ether, toluene, or any combination thereof.

* * * * *